(12) United States Patent
Ravichandran et al.

(10) Patent No.: US 12,030,480 B2
(45) Date of Patent: Jul. 9, 2024

(54) SYSTEMS AND METHODS TO COORDINATE CLUNK AND SHUFFLE MANAGEMENT WITH ENGINE STARTS IN MHT DRIVETRAINS

(71) Applicant: Ford Global Technologies, LLC, Dearborn, MI (US)

(72) Inventors: Maruthi Ravichandran, Dearborn, MI (US); Judhajit Roy, Royal Oak, MI (US); Jason Meyer, Canton, MI (US); Sassan Farahmand, Canton, MI (US); Mary Catherine Farmer, Plymouth, MI (US); Fazal Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 17/812,383

(22) Filed: Jul. 13, 2022

(65) Prior Publication Data
US 2023/0242090 A1     Aug. 3, 2023

(30) Foreign Application Priority Data

Feb. 1, 2022   (IN) .............................. 202241005496

(51) Int. Cl.
*B60W 20/15*     (2016.01)
*F02N 11/04*     (2006.01)
*F02N 11/08*     (2006.01)

(52) U.S. Cl.
CPC ............. *B60W 20/15* (2016.01); *F02N 11/04* (2013.01); *F02N 11/0851* (2013.01); *F02N 11/0859* (2013.01); *F02N 2200/102* (2013.01); *F02N 2200/105* (2013.01)

(58) Field of Classification Search
CPC ......... F02N 2200/102; F02N 2200/105; F02N 11/0859; F02N 11/0851; F02N 11/04; B60W 20/15
See application file for complete search history.

(56) References Cited

U.S. PATENT DOCUMENTS

| | | | |
|---|---|---|---|
| 7,332,884 B2 | 2/2008 | Rozman et al. | |
| 8,594,913 B2 | 11/2013 | Steuernagel | |
| 9,669,824 B2 | 6/2017 | Thompson et al. | |
| 10,106,148 B2 | 10/2018 | Meyer et al. | |
| 10,112,598 B1 * | 10/2018 | Johri | B60K 6/387 |
| 2017/0101098 A1 * | 4/2017 | Gibson | B60W 30/18 |
| 2022/0185291 A1 * | 6/2022 | Kim | B60W 20/15 |

FOREIGN PATENT DOCUMENTS

| | | |
|---|---|---|
| DE | 102010060681 A1 | 5/2012 |
| EP | 1406009 A1 | 4/2004 |
| GB | 2591698 A | 8/2021 |

* cited by examiner

*Primary Examiner* — Kevin A Lathers
(74) *Attorney, Agent, or Firm* — Vincent Mastrogiacomo; McCoy Russell LLP

(57) ABSTRACT

Systems and methods for starting an internal combustion engine of a hybrid vehicle are presented. In one example, the internal combustion is started via closing a driveline disconnect clutch and limiting a torque output rate of an electric machine so that vehicle speed may increase continuously without decreasing during engine cranking and run-up periods.

19 Claims, 5 Drawing Sheets

SYSTEMS AND METHODS TO COORDINATE CLUNK AND SHUFFLE MANAGEMENT WITH ENGINE STARTS IN MHT DRIVETRAINS

CROSS REFERENCE TO RELATED APPLICATION

This application claims priority to Indian Application Serial No. 202241005496, filed Feb. 1, 2022, which is hereby fully incorporated by reference in its entirety for all intents and purposes.

FIELD

The present description relates to methods and a system for controlling engine starting and run-up. The methods and system may be particularly useful for hybrid vehicles that start an engine via a propulsion source.

BACKGROUND AND SUMMARY

A hybrid vehicle may include an engine and an electric machine to provide propulsive effort. The engine may be stopped while the vehicle is moving from time to time to conserve fuel. If a driver demand torque or power increases, the engine may be restarted to provide additional torque to the hybrid vehicle's powertrain. The engine may be restarted via a conventional starter motor. Alternatively, the engine may be started with a belt integrated starter/generator or an integrated starter/generator.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
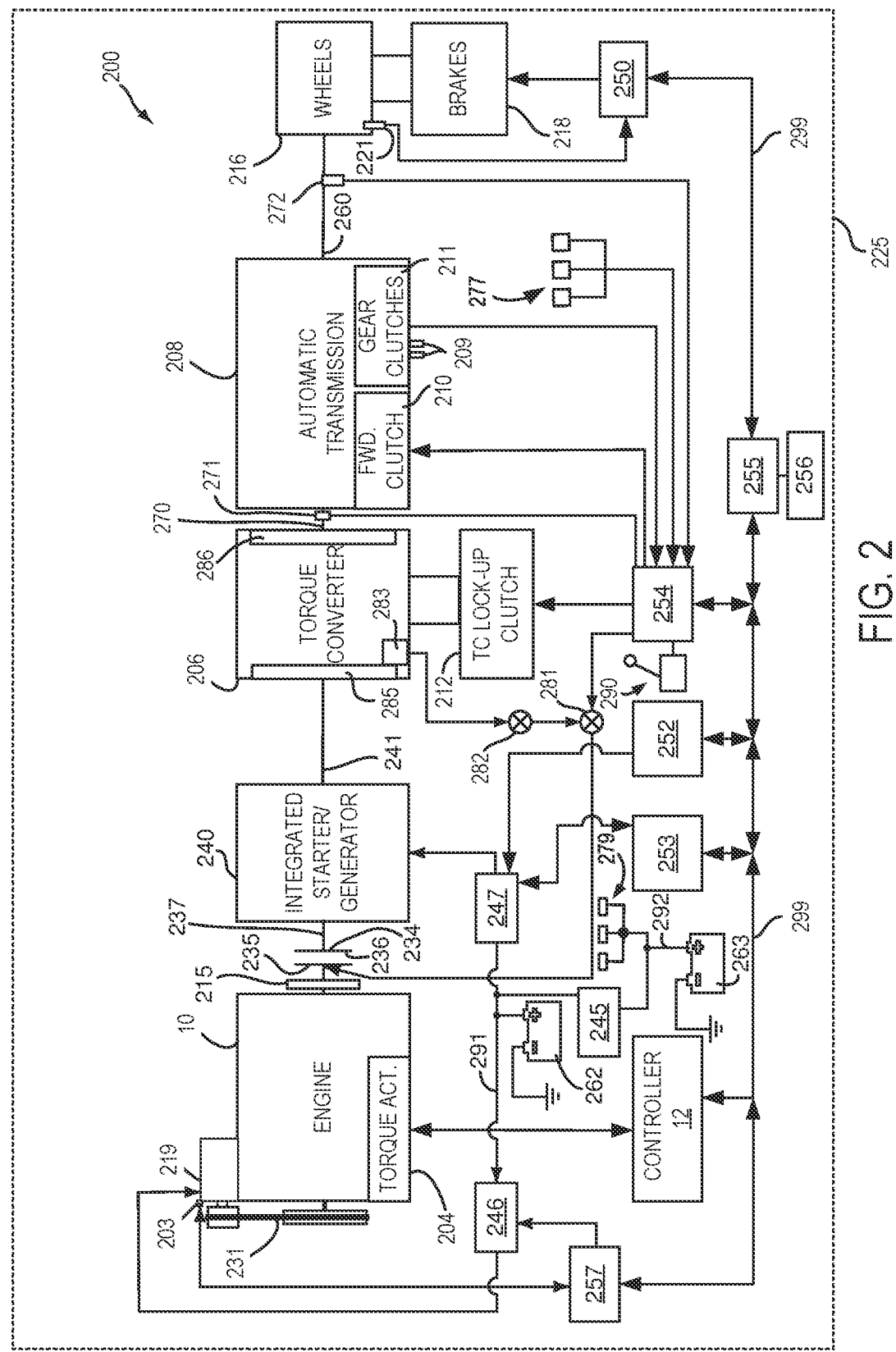
FIG. 2 is a schematic diagram of a hybrid vehicle driveline including the engine of FIG. 1.
Figure 3:
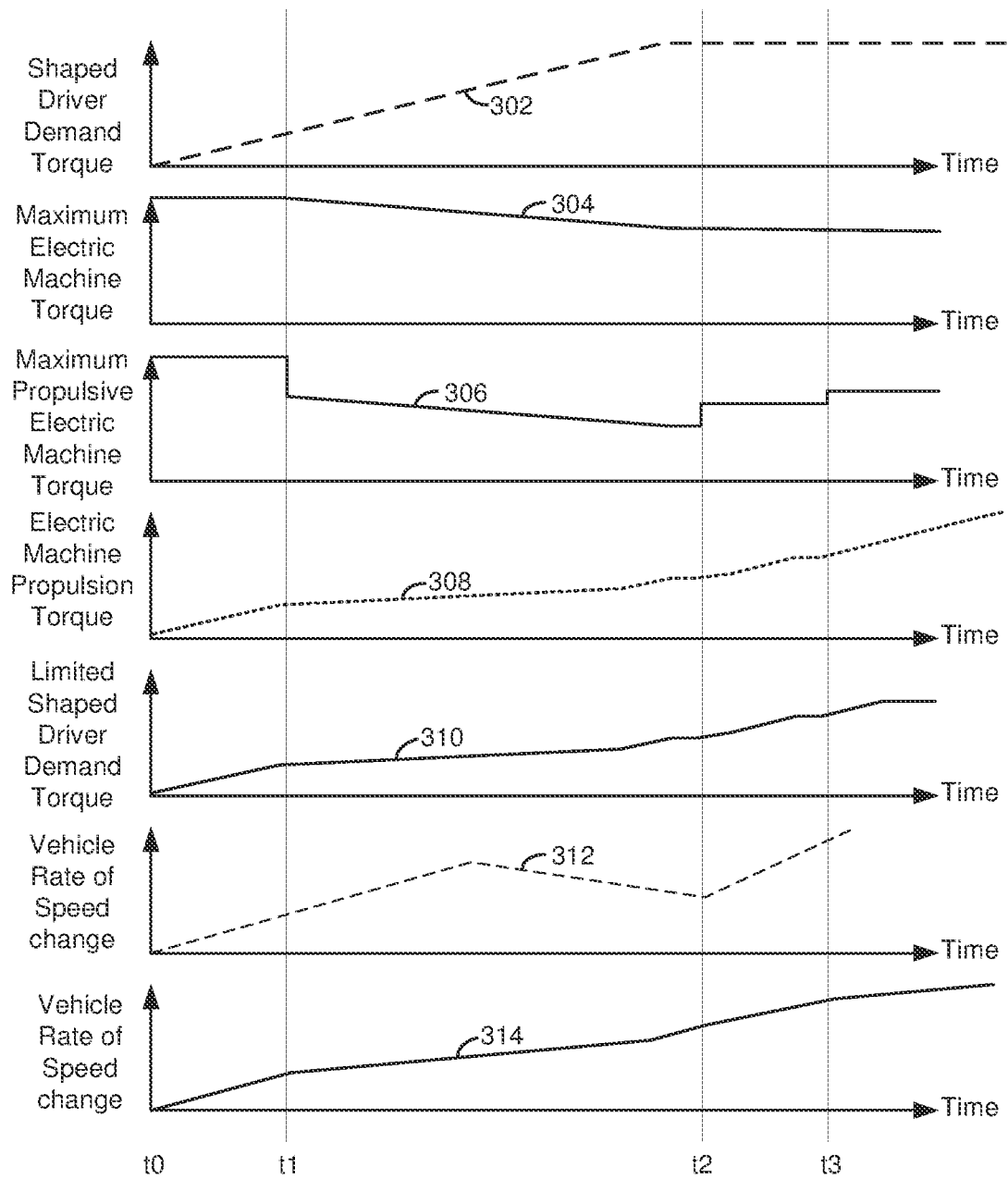
FIG. 3 shows plots of an engine starting sequence.
Figure 4:
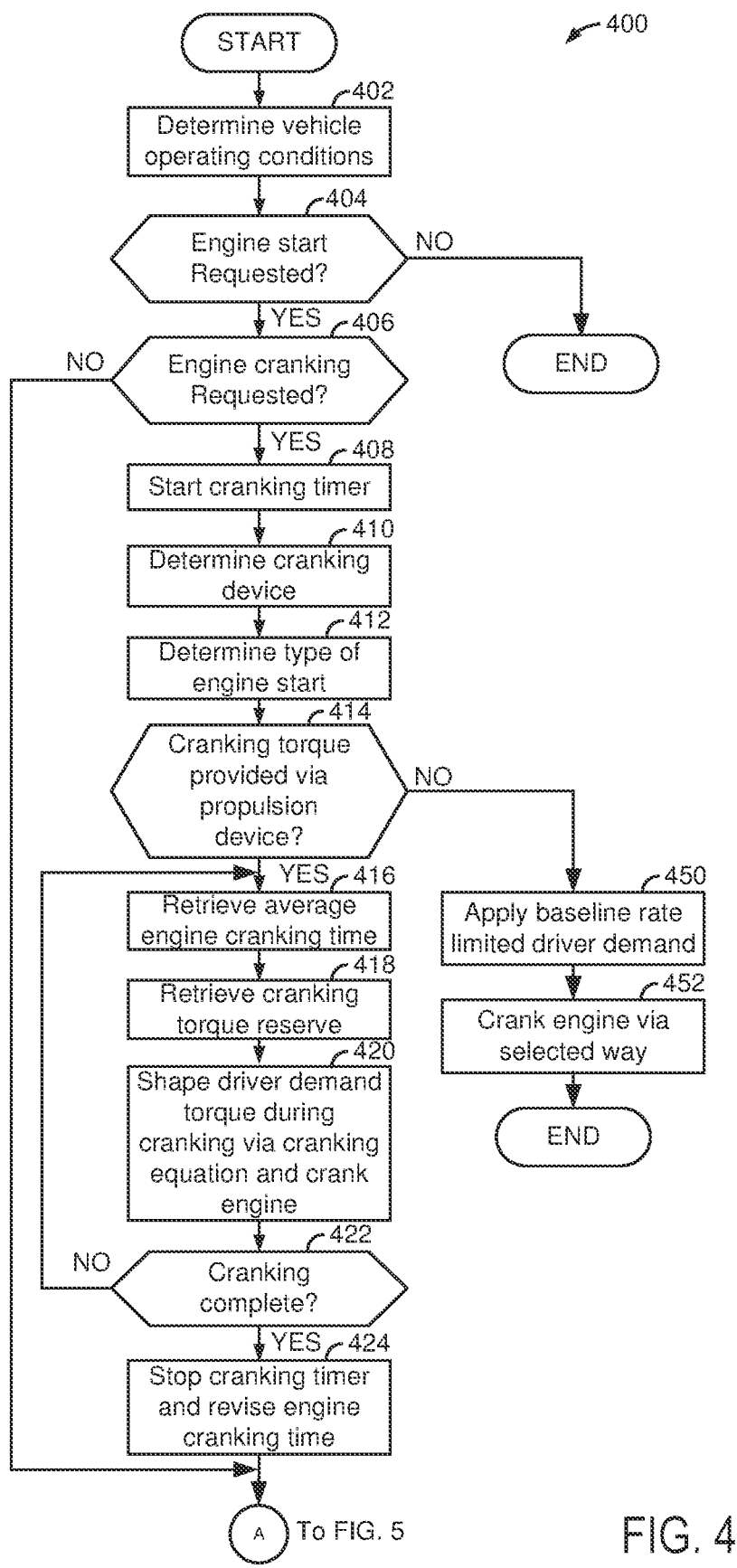
FIGS. 4 and 5 show an example method for starting an engine.
Figure 5:
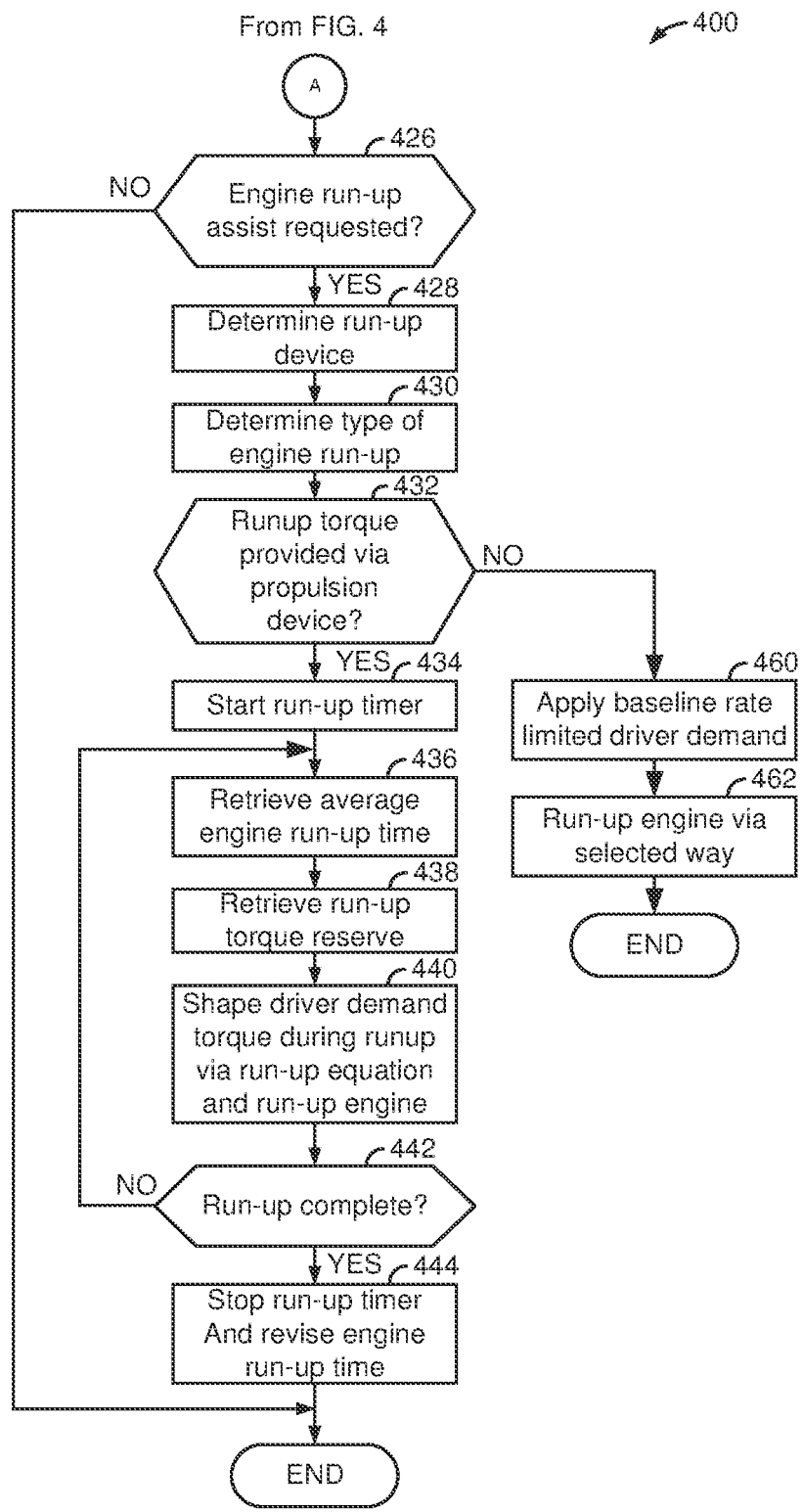

The present description is related to improving starting of an internal combustion engine of a hybrid vehicle. The hybrid vehicle may include an engine of the type shown in FIG. 1 or a diesel engine. The engine may be included in a driveline as shown in FIG. 2. An example engine starting sequence according to the method of FIGS. 4 and 5 is shown in FIG. 3. FIGS. 4 and 5 show a method for improving starting of an engine of the hybrid vehicle. The engine may be started when the vehicle is moving and increasing in speed in response to an increase in driver demand. The method of FIGS. 4 and 5 may allow vehicle speed to increase monotonically (e.g., increase without decreasing) during engine cranking and engine run-up. Accordingly, the method of FIGS. 4 and 5 may improve vehicle drivability while an engine of the vehicle is being started.

A hybrid vehicle may operate with an electric machine propelling the hybrid vehicle in an "electric only" mode. The hybrid vehicle may start an internal combustion engine when driver demand increases or when an electric energy storage device state of charge is less than a threshold state of charge. The engine may be started via an electric machine that provides propulsive effort to the hybrid vehicle. Consequently, the electric machine may provide power to propel the hybrid vehicle at a same time as the electric machine is providing power to start the engine. The power demands to simultaneously propel the vehicle and start the engine may lead to torque oscillations, which may degrade vehicle drivability. Therefore, it may be desirable to provide a way of reducing a possibility of driveline torque oscillations that may be related to engine starting.

The inventor herein has recognized the above-mentioned issues and has developed a vehicle operating method, comprising: constraining a rate of increase of a torque output of an electric machine via a controller during engine cranking to a minimum of a first torque increase rate and a second torque increase rate.

By constraining or preventing a rate of increase of a torque output of an electric machine from exceeding a minimum or a lesser of a first torque increase rate and a second torque increase rate, it may be possible to reduce a possibility of creating driveline torque oscillations. In particular, the first torque rate may be a torque increase rate that is based on reducing driveline shuffle (e.g., torque oscillations in the driveline when the driveline disconnect clutch is locked). The second torque rate may be based on driver demand torque and a difference between a nominal engine cranking time and an amount of time since the engine was most recently requested to start. By reducing the possibility of driveline torque oscillations, it may be possible for a vehicle to provide monotonically increasing vehicle during engine starting while a vehicle is moving.

The present description may provide several advantages. In particular, the approach may reduce vehicle speed oscillations while an engine is being started. Further, the approach may improve control of an electric machine that propels a vehicle. Additionally, the approach may reduce "clunk" noise that may be generated via compliance between driveline components when driveline torque adjustments are produced.

The above advantages and other advantages, and features of the present description will be readily apparent from the following Detailed Description when taken alone or in connection with the accompanying drawings.

Figure 1:
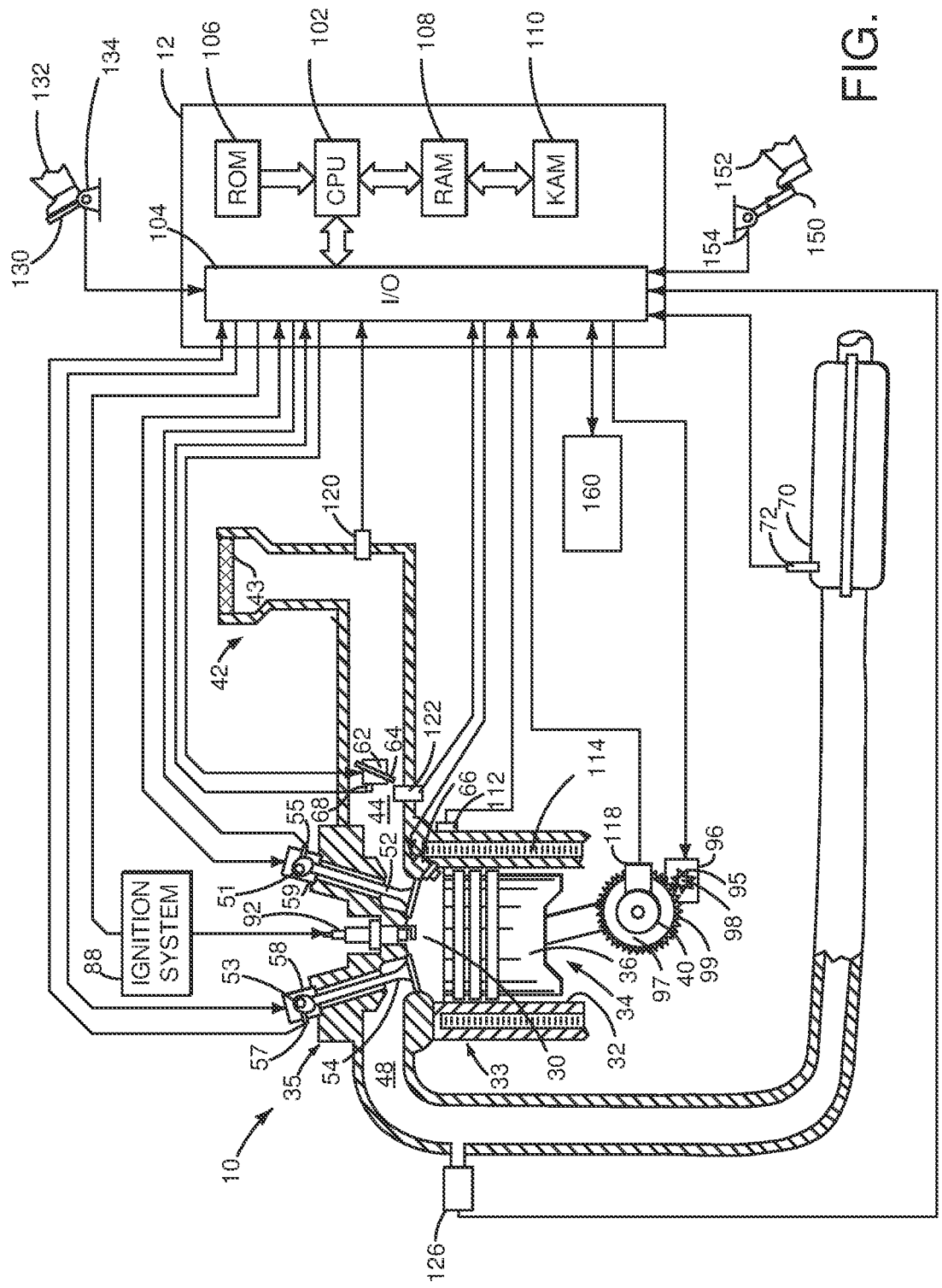
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electromechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72.

Controller 12 may receive input data from and provide output data to human/machine interface 160. Human/machine interface 160 may be a touch screen display, keyboard, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (BISG) 219. BISG 219 may be coupled to crankshaft 40 of engine 10 via a belt 231. Alternatively, BISG 219 may be directly coupled to crankshaft 40. BISG 219 may provide a negative torque to driveline 200 when charging higher voltage electric energy storage device 262 (e.g., a traction battery). BISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 246 converts DC power to AC power and vice-versa to enable power to be transferred between BISG 219 and electric energy storage device 262. Likewise, inverter 247 converts DC power to AC power and vice-versa to enable power to be transferred between ISG 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter lock-up clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 206 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 (e.g., gears 1-10) and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via brake controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine or ISG 240, and friction brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if brake controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an internal combustion engine; an electric machine; and a controller including executable instructions stored in non-transitory memory that cause the controller to constrain a rate of increase of a torque output of the electric machine during engine run-up to a minimum of a first torque increase rate and a second torque increase rate. In a first example, the system includes where the first torque increase rate is a clunk and shuffle based rate of increase. In a second example that may include the first example, the system includes where the second torque increase rate is a function of a maximum available output torque of the electric machine, an engine starting reserve torque, a previous value of a shaped driver demand torque, an amount of time to complete an engine start procedure, and an amount of time elapsed since a most recent engine start was requested. In a third example that may include one or both of the first and second examples, the system includes where the shaped driver demand torque is based on a position of a driver demand pedal. In a fourth example that may include one or more of the first through third examples, the system further comprises a driveline disconnect clutch positioned in a driveline between the internal combustion engine and the electric machine. In a fifth example that may include one or more of the first through fourth examples, the system includes where the amount of time to complete the engine start procedure begins at a time of an engine start request and ends when the driveline disconnect clutch is locked. In a sixth example that may include one or more of the first through fifth examples, the system includes where the driveline disconnect clutch is locked when a speed of a first side of the driveline disconnect clutch is within a threshold speed of a speed of a second side of the driveline disconnect clutch.

Referring now to FIG. 3, a prophetic driveline operating sequence that includes an engine start is shown. The operating sequence of FIG. 3 may be provided via the system of FIGS. 1 and 2 in cooperation with the method of FIGS. 4 and 5. The vertical lines at times t0-t3 represent times of interest during the operating sequence. The plots are time aligned.

The first plot from the top of FIG. 3 is a plot of a shaped driver demand torque versus time. The vertical axis represents shaped driver demand torque and the magnitude of the shaped driver demand torque increases in the direction of the vertical axis arrow. The horizontal axis represents time and time increases from the left side of the plot to the right side of the plot.

Trace 302 represents shaped driver demand torque. Shaped driver demand torque may be determined from referencing a table or a function that outputs driver demand torque as a function of driver demand pedal position and vehicle speed. The shaped driver demand torque is determined from the driver demand torque via applying a low pass filter and/or a torque rate of change limiter to the driver demand torque.

The second plot from the top of FIG. 3 is a plot of maximum electric machine torque versus time. The vertical axis represents the maximum torque that the electric machine may produce and the maximum electric machine torque increases in the direction of the vertical axis arrow. The horizontal axis represents time and time increases from the left side of the plot to the right side of the plot. Trace 304 represents the maximum electric machine torque.

The third plot from the top of FIG. 3 is a plot of maximum propulsive electric machine torque versus time. The maximum propulsive electric machine torque increases in the direction of the vertical axis arrow. The maximum propulsive electric machine torque is a maximum amount of torque that the electric machine (e.g., ISG 240 of FIG. 2) may supply to propel the vehicle. The maximum propulsive electric machine torque may be determined by subtracting an engine starting torque reserve from the maximum electric machine torque. The horizontal axis represents time and time increases from the left side of the plot to the right side of the plot. Trace 306 represents the maximum propulsive electric machine torque.

The fourth plot from the top of FIG. 3 is a plot of an electric machine propulsion torque versus time. The vertical axis represents the electric machine propulsion torque and the electric machine propulsion torque increases in the direction of the vertical axis arrow. The electric machine propulsion torque is an amount of torque that is provided via the electric machine (e.g., ISG 240 of FIG. 2) to propel the vehicle. The horizontal axis represents time and time increases from the left side of the plot to the right side of the plot. Trace 308 represents the electric machine propulsion torque.

The fifth plot from the top of FIG. 3 is a plot of a constrained or limited shaped driver demand torque versus time. The vertical axis represents the constrained or limited shaped driver demand torque and the constrained or limited driver demand torque increases in the direction of the vertical axis arrow. The constrained or limited shaped driver demand torque may be determined as described in the method of FIGS. 4 and 5. The horizontal axis represents time and time increases from the left side of the plot to the right side of the plot. Trace 310 represents the constrained or limited shaped driver demand torque.

The sixth plot from the top of FIG. 3 is a plot of a rate of vehicle speed change versus time for the system of FIGS. 1 and 2 when electric machine torque is not limited according to the method of FIGS. 4 and 5. The vertical axis represents a rate of vehicle speed change when the rate of electric machine torque increase is not limited according to the method of FIGS. 4 and 5. The horizontal axis represents time and time increases from the left side of the plot to the right side of the plot. Trace 312 represents a rate of vehicle speed change for the system of FIGS. 1 and 2 when electric machine torque is not limited according to the method of FIGS. 4 and 5.

The seventh plot from the top of FIG. 3 is a plot of a rate of vehicle speed change versus time for the system of FIGS. 1 and 2 when electric machine torque is limited according to the method of FIGS. 4 and 5. The vertical axis represents a rate of vehicle speed change when the rate of electric machine torque increase is not limited according to the method of FIGS. 4 and 5. The horizontal axis represents time and time increases from the left side of the plot to the right side of the plot. Trace 314 represents a rate of vehicle speed change for the system of FIGS. 1 and 2 when electric machine torque is limited according to the method of FIGS. 4 and 5.

At time t0, the vehicle is operating in "electric vehicle only" mode and the engine is not rotating (not shown). The shaped driver demand torque begins increasing. The maximum electric machine torque is at a higher level and the maximum propulsive electric machine torque is at a high level. The electric machine torque begins to increase to follow the shaped driver demand torque. The limited or constrained driver demand torque begins to increase to follow the shaped driver demand torque. The rate of vehicle speed change for conditions when the shaped driver demand is not limited begins to increase. The rate of vehicle speed change for conditions when the shaped driver demand is limited according to the method of FIGS. 4 and 5 is equal to the rate of vehicle speed change for conditions when the shaped driver demand is not limited.

At time t1, the request to start the engine is asserted (not shown) and cranking of the engine begins. The engine cranking begins by partially closing the driveline disconnect clutch so that torque from the electric machine (e.g., ISG 240 of FIG. 2) begins to transfer to the engine. The shaped driver demand torque continues increasing at its prior constant rate. The maximum electric machine torque begins declining as electric machine speed increases (not shown). The maximum propulsive torque that the electric machine may provide is decreased by an amount of torque that is applied to crank the engine (e.g., rotate the engine via an electric machine). The limited shaped driver demand torque does not increase at a same rate as the shaped driver demand once engine cranking begins. By limiting the rate of limited shaped driver demand torque, it may be possible to keep the electric machine torque output below the maximum electric machine torque output so that the rate of vehicle speed increase may not decline. The electric machine torque output follows the limited shaped driver demand torque. The rate of vehicle speed change for conditions when the shaped driver demand is not limited continues to increase at its prior rate. The rate of vehicle speed change for conditions when the shaped driver demand is limited according to the method of FIGS. 4 and 5 is reduced to less than the rate of vehicle speed change for conditions when the shaped driver demand is not limited.

Between time t1 and time t2, the shaped driver demand torque continues increasing at its prior constant rate. The maximum electric machine torque continues declining as electric machine speed increases (not shown). The maximum propulsive torque that the electric machine may provide continues to decrease as the maximum electric machine torque decreases. The limited shaped driver demand torque continues to increase at rate that is less than a rate that the shaped driver demand increases. The electric machine torque output continues to follow the limited shaped driver demand torque. The rate of vehicle speed change for conditions when the shaped driver demand is not limited continues to increase for a while, and then it decreases. The rate of vehicle speed change for conditions when the shaped driver demand is limited according to the method of FIGS. 4 and 5 continues to increase throughout the time period.

At time t2, combustion begins within the engine, which increases the maximum propulsive electric machine torque so that the electric machine may assist the vehicle speed to increase further. The shaped driver demand torque has leveled off and the maximum electric machine torque has stopped decreasing. The electric machine torque output continues to increase without decreasing since time t1 as it follows the limited shaped driver demand torque. The rate of vehicle speed change for conditions when the shaped driver demand is not limited begins to increase again. The rate of vehicle speed change for conditions when the shaped driver demand is limited according to the method of FIGS. 4 and 5 continues to increase.

At time t3, the engine speed has reached the speed of the electric machine (not shown) so the driveline disconnect clutch is fully closed and locked. This allows the maximum propulsive electric machine torque to increase again because the electric machine is no longer supplying torque to increase the speed of the engine. The shaped driver demand torque is unchanged and the maximum electric machine torque is unchanged. The electric machine torque output continues to increase without decreasing since time t1 as it follows the limited shaped driver demand torque. The rate of vehicle speed change for conditions when the shaped driver demand is not limited continues to increase. The rate of vehicle speed change for conditions when the shaped driver demand is limited according to the method of FIGS. 4 and 5 continues to increase.

In this way, a shaped driver demand torque may be limited so that an electric machine does not reach a maximum electric machine torque before an engine is started and locked to the driveline. The approach may reduce a rate of vehicle speed change, but vehicle speed does not decline while the engine is being started. This may reduce driveline clunk and shuffle (e.g., torque oscillations in the driveline).

Referring now to FIGS. 4 and 5, a method for operating a hybrid vehicle is shown. The method may be at least partially implemented as executable instructions stored in controller memory in the system of FIGS. 1 and 2. The method may be performed in cooperation with the system of FIGS. 1 and 2. Further, the method may include actions taken in the physical world to transform an operating state of the system of FIGS. 1 and 2. Additionally, the method may provide the operating sequence shown in FIG. 3 and it may include instructions for operating the driveline at the conditions described herein. The method of FIGS. 4 and 5 may be performed while a vehicle is moving.

At 402, method 400 determines vehicle operating conditions. Vehicle operating conditions may be determined via receiving inputs as shown in FIGS. 1 and 2 into a controller. Vehicle operating conditions may include but are not limited to engine operating state, catalyst temperature, ambient air temperature, engine speed, vehicle speed, and driver demand torque. Method 400 proceeds to 404 after vehicle operating conditions are determined.

At 404, method 400 judges whether or not there is an engine start request. An engine start request may be generated in response to driver demand torque exceeding a threshold driver demand torque or in response to battery state of charge being less than a threshold state of charge. In addition, an engine start request may be generated in response to other vehicle operating conditions, such as catalyst temperature, an amount of time an engine has been stopped, etc. If method 400 judges that there is an engine start request, the answer is yes and method 400 proceeds to 406. Otherwise, the answer is no and method 400 exits.

At 406, method 400 judges if engine cranking (e.g., rotating the engine via an electric machine to start the engine) is requested. Engine cranking may not be requested when the engine is to be direct started via combusting air and fuel in engine cylinders to begin engine rotation. If engine cranking is not requested, method 400 proceeds to 426. If engine cranking is requested, method 400 proceeds to 408.

At 408, method 400 starts a timer that begins from a value of zero and counts an amount of time that the engine is rotated via the electric machine. For example, the timer may count from zero to 2.5 seconds. Method 400 proceeds to 410.

At 410, method 400 determines an engine cranking device. In one example, method 400 may select the engine starting device based on vehicle operating conditions. For example, if the vehicle is not moving and the engine is stopped (e.g., not rotating), method 400 may select the starter motor to start the engine. However, in another example, if the vehicle is moving and the engine is stopped, method 400 may select ISG 240 shown in FIG. 2 to start the engine. If the engine is to be started and engine torque is not to be transmitted to the transmission immediately after starting the engine, such as if the catalyst is to be warmed, then the BISG 219 may be requested to crank the engine. Method 400 selects the electric machine to crank the engine and proceeds to 412.

At 412, method 400 determines the type of engine start. The types of engine start may include but are not limited to urgent or high priority, medium priority, and low priority. The type of engine start may be based on vehicle operating conditions such as but not limited to rate of driver demand torque increase, battery state of charge, rate of battery discharge, etc. For high priority engine starts the electric machine may provide higher levels of torque to crank the engine. At lower priority levels, the electric machine may provide lower levels of torque to crank the engine. Method 400 proceeds to 414 after determining the type of engine start that is being requested.

At 414, method 400 judges whether or not the torque to crank the engine is to be provided via an electric machine that supplies propulsive effort to the driveline. For example, if ISG 240 has been selected to crank the engine, the answer is yes and method 400 proceeds to 416. On the other hand, if starter 96 has been selected to crank the engine, the answer is no and method 400 proceeds to 450.

At 450, method 400 applies a baseline rate limit to the driver demand torque to generate a shaped driver demand. The baseline rate limit to driver demand torque may be an empirically determined rate limit that is based on an amount of clunk (e.g., audible noise generated by driveline compliance being reduced during a change in driveline torque output) and driveline shuffle (e.g., torque oscillations within the driveline that may generate an increase and/or decrease in driveline and vehicle speed that changes from a speed increase to a speed decrease or vice-versa). The baseline rate limit that is applied to the driver demand torque to generate the shaped driver demand may be determined via applying step-wise increases and decreases to the driver demand torque while monitoring driveline noise and torque. The baseline rate limiting may be adjusted manually until the observed driveline clunk and shuffle are at desired levels. Alternatively, the baseline rate limiting may be adjusted based on driveline simulations that consider driveline compliance, the natural frequency of the driveline, and vehicle performance and operational metrics. Method 400 applies the baseline rate limiting, which constrains or limits the rate of driver demand increase or decrease to less than threshold rates of increase and decrease, to the driver demand torque to generate a shaped driver demand torque. The electric machine torque is commanded to generate the shaped driver demand torque. Method 400 proceeds to 452.

At 452, method 400 cranks the engine via the selected electric machine. For example, if ISG 240 has been selected to crank the engine, the driveline disconnect clutch is partially closed from an open state and the engine is rotated via torque generated via ISG 240. Method 400 proceeds to exit.

At 416, method 400 retrieve an average or nominal engine cranking time from controller memory (e.g., RAM). An engine cranking time may be determined measured by measuring an amount of time between when engine cranking is requested and a time when engine speed exceeds a threshold engine speed. The average engine cranking time may be determined by taking an average of a most recent engine cranking times (e.g., an average of five engine cranking times). The average engine cranking time may be stored in controller RAM memory. Method 400 proceeds to 418.

At 418, method 400 retrieves an engine starting reserve torque amount or value for cranking the engine. The engine starting reserve torque amount for cranking the engine may be an amount of torque used to crank the engine at a predetermined speed (e.g., 250 revolutions/minute). The engine starting reserve torque may be stored in controller ROM and it may be based on a measured engine cranking torque. The engine starting reserve torque may be a function of an engine cranking device (e.g., ISG, BISG, starter) and a type of engine start (e.g., urgent, middle priority, low priority) and it may vary with engine temperature and other vehicle operating conditions. Method 400 proceeds to 420.

At 420, method 400 determines a rate limited shaped driver demand torque for when the engine is being cranked. The rate limited shaped driver demand torque while the engine is being cranked may be determined via the following equation:

$$\text{rr\_dd\_shpd} = \min\left(\text{rr\_clk\_shfl}, \left(\frac{tq\max - tqstrtres - tqddshpprev}{tmengcrk - telapengstrt}\right)\right)$$

where rr_dd_shpd is the rate limited shaped driver demand torque, min is a function that returns a lesser of argument 1 (rr_clk_shfl) and argument 2 ((qmax-tqstrtres-tqddshpprev)/(tmengcrk-telapengstrt)), rr_crk_shfl is the baseline rate limited driver demand torque as mentioned at step 450 and which may be referred to as the shaped driver demand torque, tqmax is the maximum output torque of the electric machine that is cranking the engine, tqstrtsres is an amount of electric machine torque that is reserved for starting the engine, tqddshpprev is a most recent prior amount of shaped driver demand torque, tmengcrk is the average or nominal time to crank the engine as determined at 416, and telapengstrt is an amount of time that has elapsed since a most recent engine start was requested.

Thus, the rate limited shaped driver demand torque (e.g., driver demand torque that is constrained or limited from increasing or decreasing by more than a threshold rate) is a function of a baseline rate limited driver demand torque and a second torque that is constrained and/or limited according to a prior amount of shaped driver demand torque and a difference between an average engine cranking time and an elapsed engine cranking time. The driveline disconnect clutch may be partially closed to crank the engine. Method 400 commands the electric machine that cranks the engine to the rate limited shaped driver demand torque. Method 400 proceeds to 422.

At 422, method 400 judges if the engine cranking is complete. The engine cranking may be complete when torque generated via combustion in the engine causes engine speed to exceed a threshold speed (e.g., 275 revolutions/minute). If method 400 judges that engine cranking is complete, the answer is yes and method 400 proceeds to 424. Otherwise, the answer is no and method 400 returns to 416.

At 424, method 400 stops the engine cranking timer and averages the most recent engine cranking time with a predetermined number of prior engine cranking times to generate an average or nominal engine cranking time. Method 400 stores the average cranking time to controller RAM. Method 400 proceeds to 426.

At 426, 400 judges if engine run-up (e.g., the time between when the engine exits cranking mode and reaches a desired speed such as an engine idle speed or a speed of the ISG) assistance is requested. Engine run-up assistance may not be requested when the engine is to be direct started via combusting air and fuel in engine cylinders to begin engine rotation. If engine run-up assist is not requested, method 400 proceeds to exit. If engine run-up assist is requested, method 400 proceeds to 428.

At 428, method 400 starts a timer that begins from a value of zero and counts an amount of time that the engine is assisted by the electric machine during run-up. For example, the timer may count from zero to 1.5 seconds. Method 400 proceeds to 430.

At 430, method 400 determines an engine run-up device. In one example, method 400 may select the engine run-up device based on vehicle operating conditions. For example, if the vehicle is not moving and the engine is stopped (e.g., not rotating), method 400 may select the BISG 219 to assist engine run-up. However, in another example, if the vehicle is moving and the engine is stopped, method 400 may select ISG 240 shown in FIG. 2 to assist engine run-up. Method 400 selects the electric machine to assist engine run-up and proceeds to 432.

At 432, method 400 determines the type of engine run-up. The types of engine start may include but are not limited to urgent or high priority, medium priority, and low priority. The type of engine run-up may be based on vehicle operating conditions such as but not limited to rate of driver demand torque increase, battery state of charge, rate of battery discharge, etc. For high priority run-ups the electric machine may provide higher levels of torque to assist the engine to reach the desired speed. At lower priority levels, the electric machine may provide little or no torque to assist the engine reaching the desired engine speed. Method 400 proceeds to 434 after determining the type of engine start that is being requested.

At 434, method 400 judges whether or not the torque to run the engine up is to be provided via an electric machine that supplies propulsive effort to the driveline. For example, if ISG 240 has been selected to run the engine up to ISG speed, the answer is yes and method 400 proceeds to 436. On the other hand, if starter 96 has been selected to crank the engine, the answer is no and method 400 proceeds to 460.

At 460, method 400 applies a baseline rate limit to the driver demand torque to generate a shaped driver demand. The baseline rate limit to driver demand torque may be an empirically determined rate limit that is based on an amount of clunk (e.g., audible noise generated by driveline compliance being reduced during a change in driveline torque output) and driveline shuffle (e.g., torque oscillations within the driveline that may generate an increase and/or decrease in driveline and vehicle speed that changes from a speed increase to a speed decrease or vice-versa). Method 400 applies the baseline rate limiting, which constrains or limits the rate of driver demand increase or decrease to less than threshold rates of increase and decrease, to the driver demand torque to generate a shaped driver demand torque. The electric machine torque is commanded to generate the shaped driver demand torque. Method 400 proceeds to 462.

At 462, method 400 runs the engine up to a desired speed via the selected electric machine, if an electric machine has been selected. For example, if BISG 219 has been selected to crank the engine, the engine is run-up assisted via torque generated via BISG 219. Method 400 proceeds to exit.

At 436, method 400 retrieves an average or nominal time to complete an engine start procedure from controller memory (e.g., RAM). Average amount of time to complete the engine start procedure may be determined by measuring an amount of time between when the engine start is requested and when the engine speed exceeds a second threshold engine speed. The average amount of time to complete the engine start procedure may be determined by taking an average of a most recent amount of time to complete the engine start procedure and a predetermined number of times to complete the engine start procedure (e.g., an average of five engine run-up times). The average amount of time to complete the engine start procedure engine may be stored in controller RAM memory. Method 400 proceeds to 438.

At 438, method 400 retrieves an engine run-up reserve torque reserve amount or value for running up the engine. The engine run-up reserve torque for engine run-up may be a function of engine run-up device and type of engine start. The engine run-up reserve torque may be an amount of torque used to run the engine up at a rate that may be based on the run-up urgency level. The engine run-up reserve torque may be stored in controller ROM and it may be based on a measured engine run-up torque. The engine run-up reserve torque may vary with engine temperature and other vehicle operating conditions. Method 400 proceeds to 440.

At 440, method 400 determines a rate limited shaped driver demand torque for when the engine is running up. The rate limited shaped driver demand torque while the engine is being run-up may be determined via the following equation:

$$\text{rr\_dd\_shpd} = \min\left(\text{rr\_clk\_shfl}, \left(\frac{tq\max - tqstrtres - tqddshpprev}{tmengstrt - telapengstrt}\right)\right)$$

where rr_dd_shpd is the rate limited shaped driver demand torque, min is a function that returns a lesser of argument 1 (rr_clk_shfl) and argument 2 ((qmax-tqstrtres-tqddshpprev)/(tmengcrk-telapengstrt)), rr_crk_shfl is the baseline rate limited driver demand torque as mentioned at step 450 and which may be referred to as the shaped driver demand torque, tqmax is the maximum output torque of the electric machine that is cranking the engine, tqstrtsres is an amount of electric machine torque that is reserved for starting the engine, tqddshpprev is a most recent prior amount of shaped driver demand torque, tmengstrt is the average or nominal time to complete an engine start procedure (e.g., an amount of time between an engine start request and a time that the engine reaches a threshold speed or a time that the driveline disconnect clutch is fully closed) as determined at 436, and telapengstrt is an amount of time that has elapsed since a most recent engine start was requested.

Thus, the rate limited shaped driver demand torque (e.g., driver demand torque that is constrained or limited from increasing or decreasing by more than a threshold rate) during engine run-up is a function of a baseline rate limited driver demand torque and a second torque that is constrained and/or limited according to a prior amount of shaped driver demand torque and a difference between an average engine run-up time and an elapsed engine cranking time. Method 400 commands the electric machine that runs the engine up to the rate limited shaped driver demand torque. The driveline disconnect clutch may be at least partially closed during engine run-up. Method 400 proceeds to 442.

At 442, method 400 judges if the engine run-up is complete. The engine run-up may be complete when engine speed is equal to ISG speed, when engine speed is equal to or greater than a threshold speed (e.g., a requested engine idle speed), or when the driveline disconnect clutch is locked (e.g., when there is less than a threshold speed difference between speed of a first side of the driveline disconnect clutch and a speed of a second side of the driveline disconnect clutch) and fully closed. If method 400 judges that engine run-up is complete, the answer is yes and method 400 proceeds to 444. Otherwise, the answer is no and method 400 returns to 436.

At 444, method 400 stops the engine run-up timer and averages the most recent engine run-up time with a predetermined number of prior engine run-up times to generate an average or nominal engine run-up time. Method 400 stores the average run-up time to controller RAM. Method 400 proceeds to exit.

In this way, electric machine torque may be limited or constrained during engine cranking and engine run-up so that the electric machine may not reach the electric machine's maximum torque output. Consequently, the electric machine may cause vehicle speed to increase monotonically during engine cranking and run-up.

Thus, the method of FIGS. 4 and 5 provide for a vehicle operating method, comprising: constraining a rate of increase of a torque output of an electric machine via a controller during engine cranking to a minimum of a first torque increase rate and a second torque increase rate. In a first example, the vehicle operating method includes where the first torque increase rate is a clunk and shuffle based rate of increase. In a second example that may include the first example, the vehicle operating method includes where the second torque increase rate is a function of a maximum available output torque of the electric machine, an engine starting reserve torque, a previous value of a shaped driver demand torque, an amount of time to crank an engine, and an amount of time elapsed since a most recent engine start was requested. In a third example that may include one or both of the first and second examples, the vehicle operating method includes where the engine starting reserve torque is a function of an engine cranking device and a type of engine start. In a fourth example that may include one or more of the first through third examples, the vehicle operating method includes where the time to crank the engine is a function of the engine cranking device and the type of engine start. In a fifth exampel that may include one or more of the first through fourth examples, the vehicle operating method includes where the time to complete the engine start procedure is a function of the engine cranking device and the type of engine start. In a sixth example that may include one or more of the first through fifth examples, the vehicle operating method includes where the electric machine is an integrated starter/generator positioned in a driveline between a driveline disconnect clutch and a torque converter. In a seventh example that may include one or more of the first through sixth examples, the vehicle operating method further comprises constraining the rate of increase of the torque output of the electric machine via the controller during engine run-up to a minimum of the first torque increase rate and a third torque increase rate.

The method of FIGS. 4 and 5 also provides for a vehicle operating method, comprising: constraining a rate of increase of a torque output of an electric machine via a controller such that a speed of a vehicle increases without decreasing during engine cranking and engine run-up of an engine start, and where the engine start includes closing a driveline disconnect clutch. In a first example, the vehicle operating method includes where constraining the rate of increase of the torque output of the electric machine includes constraining the rate of increase of the torque output of the electric machine during engine cranking to a minimum of a first torque increase rate and a second torque increase rate. In a second example that may include the first example, the vehicle operating method includes where constraining the rate of increase of the torque output of the electric machine includes constraining the rate of increase of the torque output of the electric machine during engine run-up to a minimum of the first torque increase rate and a third torque increase rate. In a third example that may include one or both of the first and second examples, the vehicle operating method includes where the second torque increase rate is a function of a maximum available output torque of the electric machine, an engine starting reserve torque, a previous value of a shaped driver demand torque, an amount of time to crank an engine, and an amount of time elapsed since a most recent engine start was requested. In a fourth example that may include one or more of the first through third examples, the vehicle operating method includes where the third torque increase rate is a function of the maximum available output torque of the electric machine, the engine starting reserve torque, the previous value of a shaped driver demand torque, an amount of time to complete an engine start procedure, and the amount of time elapsed since a most recent engine start was requested.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
constraining a rate of increase of a torque output of an electric machine via a controller during engine cranking to a minimum of a first torque increase rate and a second torque increase rate.

2. The vehicle operating method of claim 1, where the first torque increase rate is determined via increasing driver demand torque and monitoring driveline torque.

3. The vehicle operating method of claim 1, where the second torque increase rate is a function of a maximum available output torque of the electric machine, an engine starting reserve torque, a previous value of a shaped driver demand torque, an amount of time to crank an engine, and an amount of time elapsed since a most recent engine start was requested.

4. The vehicle operating method of claim 3, where the engine starting reserve torque is a function of an engine cranking device and a type of engine start.

5. The vehicle operating method of claim 4, where the amount of time to crank the engine is a function of the engine cranking device and the type of engine start.

6. The vehicle operating method of claim 5, where the rate of increase of the torque output is constrained while a driveline disconnect clutch is at least partially closed.

7. The vehicle operating method of claim 1, where the electric machine is an integrated starter/generator positioned in a driveline between a driveline disconnect clutch and a torque converter.

8. The vehicle operating method of claim 1, further comprising constraining the rate of increase of the torque output of the electric machine via the controller during engine run-up to a minimum of the first torque increase rate and a third torque increase rate.

9. A system, comprising:
an internal combustion engine;
an electric machine; and
a controller including executable instructions stored in non-transitory memory that cause the controller to constrain a rate of increase of a torque output of the electric machine during engine run-up to a minimum of a first torque increase rate and a second torque increase rate.

10. The system of claim 9, where the first torque increase rate is determined via increasing driver demand torque and monitoring driveline torque.

11. The system of claim 10, where the second torque increase rate is a function of a maximum available output torque of the electric machine, an engine starting reserve torque, a previous value of a shaped driver demand torque, an amount of time to complete an engine start procedure, and an amount of time elapsed since a most recent engine start was requested.

12. The system of claim 11, where the shaped driver demand torque is based on a position of a driver demand pedal.

13. The system of claim 12, further comprising a driveline disconnect clutch positioned in a driveline between the internal combustion engine and the electric machine.

14. The system of claim 13, where the amount of time to complete the engine start procedure begins at a time of an engine start request and ends when the driveline disconnect clutch is locked.

15. The system of claim 14, where the driveline disconnect clutch is locked when a speed of a first side of the driveline disconnect clutch is within a threshold speed of a speed of a second side of the driveline disconnect clutch.

16. A vehicle operating method, comprising:
constraining a rate of increase of a torque output of an electric machine via a controller such that a speed of a vehicle increases without decreasing during engine cranking and engine run-up of an engine start, and where the engine start includes closing a driveline disconnect clutch, where constraining the rate of increase of the torque output of the electric machine includes constraining the rate of increase of the torque output of the electric machine during engine cranking to a minimum of a first torque increase rate and a second torque increase rate.

17. The vehicle operating method of claim 16, where constraining the rate of increase of the torque output of the electric machine includes constraining the rate of increase of the torque output of the electric machine during engine run-up to a minimum of the first torque increase rate and a third torque increase rate.

18. The vehicle operating method of claim 17, where the second torque increase rate is a function of a maximum available output torque of the electric machine, an engine starting reserve torque, a previous value of a shaped driver demand torque, an amount of time to crank an engine, and an amount of time elapsed since a most recent engine start was requested.

19. The vehicle operating method of claim 18, where the third torque increase rate is a function of the maximum available output torque of the electric machine, the engine starting reserve torque, the previous value of a shaped driver demand torque, an amount of time to complete an engine start procedure, and the amount of time elapsed since a most recent engine start was requested.

* * * * *